(No Model.)
C. E. SWIFT.
DERRICK.
No. 463,009. Patented Nov. 10, 1891.
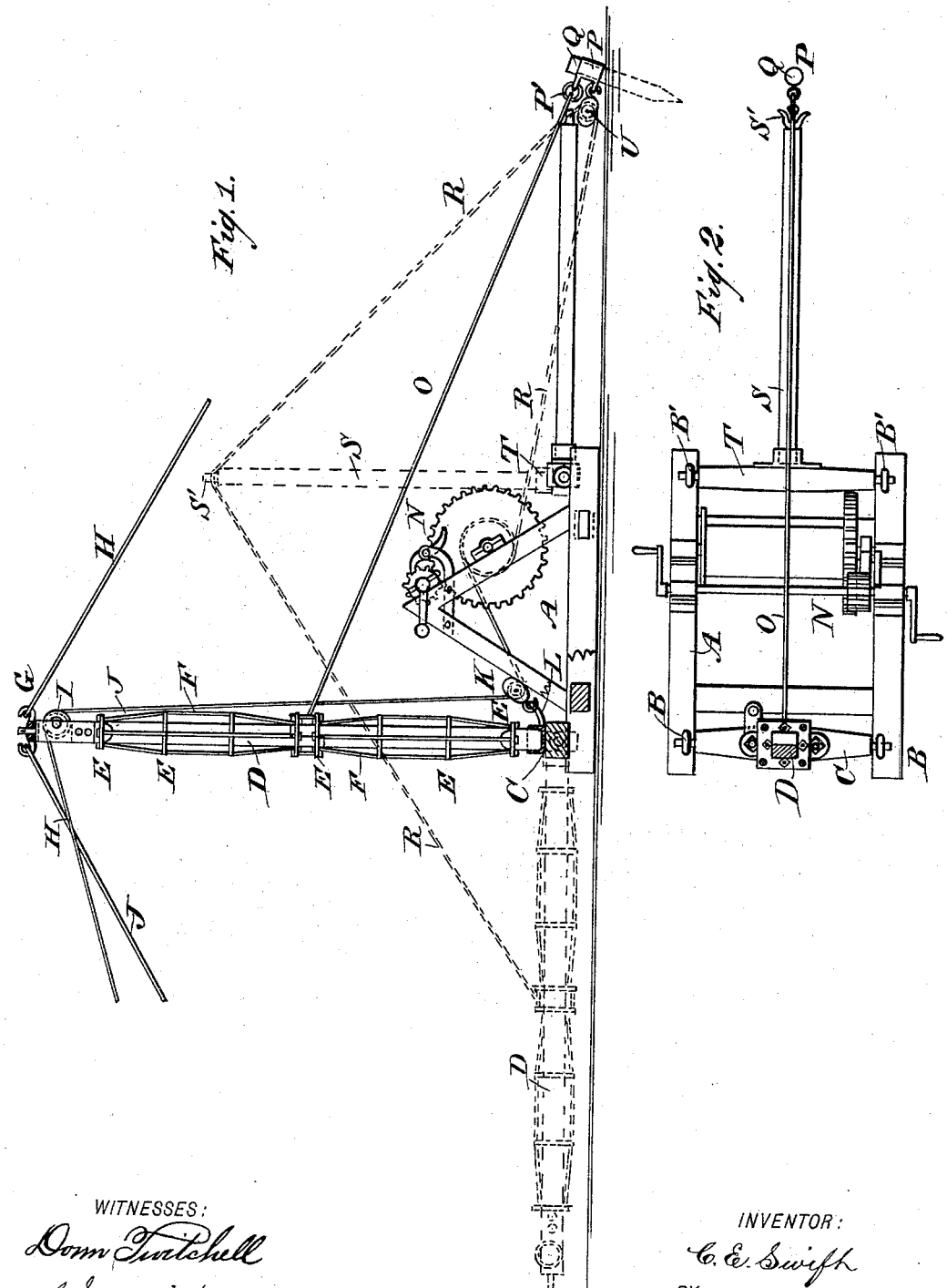
WITNESSES:
INVENTOR:

UNITED STATES PATENT OFFICE.

CHARLES E. SWIFT, OF TONICA, ILLINOIS.

DERRICK.

SPECIFICATION forming part of Letters Patent No. 463,009, dated November 10, 1891.

Application filed April 25, 1891. Serial No. 390,413. (No model.)

*To all whom it may concern:*

Be it known that I, CHARLES E. SWIFT, of Tonica, in the county of La Salle and State of Illinois, have invented a new and Improved Derrick, of which the following is a full, clear, and exact description.

The object of the invention is to provide a new and improved derrick which is simple and durable in construction and more particularly designed for conveniently hoisting and setting various structures, such as towers for windmills, electric lights, &c.

The invention consists of certain parts and details and combinations of the same, as will be hereinafter fully described, and then pointed out in the claim.

Reference is to be had to the accompanying drawings, forming a part of this specification, in which similar letters of reference indicate corresponding parts in both the figures.

Figure 1 is a side elevation of the improvement, with parts in section; and Fig. 2 is a plan view of the same, with part of the boom in section.

The improved derrick is provided with a suitably-constructed base A, on the front end of which are formed bearings B, in which is journaled a cross-piece C, supporting in its middle the derrick-boom D, of suitable length. The boom D is preferably made in several sections spliced together in the usual way and the boom is strengthened by a series of plates E, arranged one above the other and connected with each other by truss-rods F.

On the extreme upper end of the boom D is secured a plate G, provided with hooks connected with guy ropes or rods H, extending to the ground and fastened thereto by stakes driven in the ground. Near the upper end of the boom D is arranged a pulley I, over which passes a rope J, adapted to be connected with the structure to be hoisted. The rope J extends from the pulley I downward in the rear of the boom and passes under a sheave K, hung on a hook L, fastened to the cross-piece C alongside the boom D. The rope J then extends to and is wound on the drum of a windlass N, set on the base A and provided with a pawl and ratchet for locking the drum in place.

In order to securely hold the boom D in place, a brace O is preferably connected with the boom at or near its middle and extends rearwardly to a ring P', fastened on a sleeve P, secured on the outer end of a stake Q, driven into the ground, as plainly shown in Fig. 1.

In order to swing the boom D into a vertical position, a rope R is provided, adapted to be connected with the boom at or near its middle, as plainly shown in dotted lines in Fig. 1. The rope R extends upwardly over the forked end S' of a post S, secured at its lower end on a cross-piece T, similar to the cross-piece C, and mounted to turn in suitable bearings B', secured on the base A. The cross-piece T is in the rear of the windlass N, so that the latter is between the post S and the boom D. The rope after leaving the forked end S' of the post S passes over a sheave U, hung upon the sleeve P, previously mentioned. The rope then winds on the drum of the windlass N. Now when the boom D is in a lowermost position, as shown in dotted lines in Fig. 1, and the rope R has been connected with the said boom and passes over the post S, which had previously been moved into a vertical position, then the said boom can be swung in a vertical position by the operator turning the windlass N, so as to wind up the rope R. The boom D will then readily swing into the desired position to be then fastened in place by attaching the guy-ropes H to the stakes driven in the ground, as before mentioned. The rope R is then disconnected from the boom D and the post S is swung downward into the position shown in Fig. 1. The windlass N is then actuated in the manner above specified for hoisting the structure by means of the rope J.

It will be seen that the derrick constructed in this manner is very simple and can be readily set up near the structure to be hoisted.

The boom is preferably made in sections, which can be taken apart for convenient transportation.

Having thus fully described my invention, I claim as new and desire to secure by Letters Patent—

A derrick comprising a base A, a boom D, pivoted on the base and provided with a pulley I at its top, a post S, pivoted on the base and having a forked upper end, a windlass N between the post and boom, a sheave K at
5 the lower end of the boom, guy-ropes H, secured to the upper end of the boom, a stake Q a short distance from the base and provided with a sheave P, and ropes I O, wound on the windlass in opposite directions, substantially as herein shown and described.

CHARLES E. SWIFT.

Witnesses:
WILLIAM T. COWELL,
E. H. MILLER.